United States Patent Office 2,896,615
Patented July 28, 1959

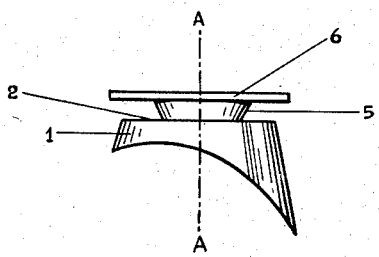
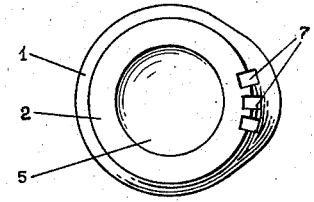
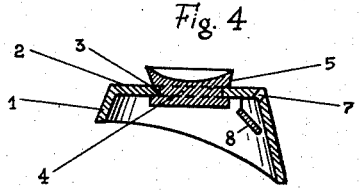
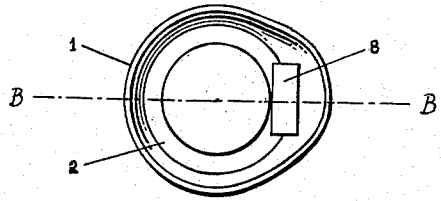

2,896,615

PROTECTIVE COVER FOR AN EYE

Paul Szigeti, Tel Aviv, Israel

Application May 21, 1957, Serial No. 660,641

Claims priority, application Israel May 26, 1956

1 Claim. (Cl. 128—132)

My invention relates to a protective cover for an eye. The protective cover for an eye according to my invention comprises an eye cup having face fitting edges, said eye-cup being adapted to be removably supported on a spectacle lens by means of a suction cup detachably mounted in a central aperture in the base of the eye-cup. Small apertures for ventilation are provided between the base and the rim of the eye-cup and an opaque plate mounted between the said apertures and the eye.

My invented protective cover for an eye is particularly useful in a hot climate.

My invented protective cover for an eye is used for treatment of an asquint eye.

My invention is further described and illustrated by an embodiment and shown by way of example in the accompanying drawing, in which:

Fig. 1 is a front view of the eye-cover according to my invention.

Fig. 2 is a back view of the eye-cover.

Fig. 3 is a view from above of the eye-cover.

Fig. 4 is a cross-section, according to the line B—B, of Fig. 2.

Fig. 5 is a view from above of the suction-cup.

The drawings show the protective cover of an eye comprising an eye-cup 1 having face fitting edges. The eye-cup 1 is adapted to be removably supported on a spectacle lens 6 by means of a suction-cup 4—5 detachably mounted in a central aperture 3 in the base 2 of the eye-cup 1.

Small apertures 7 for ventilation are provided between the base 2 and the rim of the eye-cup 1 and an opaque-plate 8 mounted between the said apertures 7 and the eye.

What I claim is:

A protective cover for an eye comprising an eye-cup having a rim with face fitting edges, said eye-cup being adapted to be removably supported on a spectacle lens by means of a suction cup detachably mounted in a central aperture in the base of the eye-cup, small apertures for ventilation being provided between the base and the rim of the eye-cup and an opaque plate mounted within the eye-cup over said small ventilating apertures, but spaced therefrom.

References Cited in the file of this patent

FOREIGN PATENTS

| 164,162 | Germany | Oct. 31, 1905 |
| 21,318 of 1907 | Great Britain | Sept. 26, 1907 |